US012749160B2

(12) United States Patent
Zhang et al.

(10) Patent No.: US 12,749,160 B2
(45) Date of Patent: Sep. 29, 2026

(54) IMAGE RESTORATION METHOD AND APPARATUS, ELECTRONIC DEVICE, AND STORAGE MEDIUM

(71) Applicant: SUZHOU METABRAIN INTELLIGENT TECHNOLOGY CO., LTD., Suzhou (CN)

(72) Inventors: Yingjie Zhang, Suzhou (CN); Hongzhi Shi, Suzhou (CN); Yaqian Zhao, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 242 days.

(21) Appl. No.: 18/691,024

(22) PCT Filed: May 26, 2022

(86) PCT No.: PCT/CN2022/095379
§ 371 (c)(1),
(2) Date: Mar. 11, 2024

(87) PCT Pub. No.: WO2023/130650
PCT Pub. Date: Jul. 13, 2023

(65) Prior Publication Data

US 2024/0378702 A1 Nov. 14, 2024

(30) Foreign Application Priority Data

Jan. 4, 2022 (CN) ......................... 202210000435.0

(51) Int. Cl.
*G06T 5/60* (2024.01)
*G06F 18/214* (2023.01)
(Continued)

(52) U.S. Cl.
CPC .............. *G06T 5/60* (2024.01); *G06F 18/214* (2023.01); *G06F 18/253* (2023.01); *G06T 5/00* (2013.01);
(Continued)

(58) Field of Classification Search
CPC .... G06T 5/00; G06T 5/50; G06T 5/60; G06T 5/73; G06T 2207/10024;
(Continued)

(56) References Cited

U.S. PATENT DOCUMENTS

2014/0029850 A1* 1/2014 Meyers ..................... G06T 5/50 382/167
2015/0195464 A1* 7/2015 Sharma ................ H04N 23/741 348/217.1
(Continued)

FOREIGN PATENT DOCUMENTS

CN 108305236 A 7/2018
CN 109191388 A 1/2019
(Continued)

OTHER PUBLICATIONS

Wu et al., "An Improved Method of Low Light Image Enhancement Based on Retinex", 2021 IEEE 6th International Conference on Image, Vision and Computing (ICIVC), pp. 233-241. (Year: 2021).*
(Continued)

*Primary Examiner* — Jennifer Mehmood
*Assistant Examiner* — Jose M Torres
(74) *Attorney, Agent, or Firm* — IPro, PLLC

(57) ABSTRACT

An image restoration method includes: acquiring an original low-light image to be restored; acquiring a pre-trained image processing model; and inputting the original low-light image into the image processing model, so that an optical feature extraction network in the image processing model extracts an illumination feature from the original low-light image,
(Continued)

and an image feature extraction network extracts a target image feature from the original low-light image, and generating a target bright image based on the illumination feature and the target image feature. The optical feature extraction network and the image feature extraction network are respectively used to process an image feature of an original low-light image, so as to obtain an illumination feature and a target image feature, and the illumination feature is then fused with the target image feature for image restoration to obtain a bright image.

20 Claims, 3 Drawing Sheets

(51) Int. Cl.

| | |
|---|---|
| ***G06F 18/25*** | (2023.01) |
| ***G06T 5/00*** | (2024.01) |
| ***G06T 5/50*** | (2006.01) |
| ***G06T 5/73*** | (2024.01) |

(52) U.S. Cl.
CPC .................. *G06T 5/50* (2013.01); *G06T 5/73* (2024.01); *G06T 2207/10024* (2013.01); *G06T 2207/10144* (2013.01); *G06T 2207/20021* (2013.01); *G06T 2207/20081* (2013.01); *G06T 2207/20084* (2013.01); *G06T 2207/20132* (2013.01)

(58) Field of Classification Search
CPC . G06T 2207/10144; G06T 2207/20021; G06T 2207/20081; G06T 2207/20084; G06T 2207/20132; G06F 18/214; G06F 18/253
See application file for complete search history.

(56) References Cited

U.S. PATENT DOCUMENTS

| | | | | |
|---|---|---|---|---|
| 2021/0133932 | A1 | 5/2021 | Lee et al. | |
| 2021/0133938 | A1* | 5/2021 | Lee | G06T 3/40 |
| 2021/0272236 | A1* | 9/2021 | Wang | G06T 5/94 |
| 2021/0272246 | A1* | 9/2021 | Meng | G06T 5/92 |
| 2022/0366532 | A1* | 11/2022 | Shanmuga Vadivel | G06T 3/4046 |
| 2023/0036222 | A1* | 2/2023 | Fu | G06T 5/92 |
| 2023/0186446 | A1* | 6/2023 | Marti | G06T 5/92 382/274 |
| 2023/0215132 | A1* | 7/2023 | Li | G06T 5/50 |
| 2024/0062530 | A1* | 2/2024 | Panetta | G06V 10/7715 |

FOREIGN PATENT DOCUMENTS

| | | | |
|---|---|---|---|
| CN | 111242868 | A | 6/2020 |
| CN | 113744169 | A | 12/2021 |
| CN | 114022394 | A | 2/2022 |
| KR | 20210053052 | A | 5/2021 |

OTHER PUBLICATIONS

Sun et al., “Progressive Two-Stage Network for Low-Light Image Enhancement”, Micromachines 2021, 12, 1458, pp. 1-10. (Year: 2021).*

* cited by examiner

IMAGE RESTORATION METHOD AND APPARATUS, ELECTRONIC DEVICE, AND STORAGE MEDIUM

CROSS-REFERENCE TO RELATED APPLICATION

The present disclosure claims the priority of Chinese patent application filed on Jan. 4, 2022 before the CNIPA, China National Intellectual Property Administration with the application number of 202210000435.0, and the title of "IMAGE RESTORATION METHOD AND APPARATUS, ELECTRONIC DEVICE, AND STORAGE MEDIUM", which is incorporated herein in its entirety by reference.

FIELD

The present disclosure relates to the field of image processing and more particularly, to an image restoration method and apparatus, an electronic device, and a storage medium.

BACKGROUND

Super resolution (SR) is a process of recovering a high-resolution image from a given low-resolution image. It is a classical application of computer vision and has important application value in monitoring equipment, satellite image remote sensing, and other fields.

In the scene of monitoring or remote sensing, when lacking of light in the night or foggy days and the like, the quality of the acquired image is very poor. At this time, the image obtained by directly performing super-resolution will appear gray and fuzzy, and may not achieve the role of improving the visual effect, so it needs to perform low-light image enhancement technology again on the image for image restoration.

Applicants have appreciated that the super-resolution models of the prior art, which are mostly super resolution applied under sufficient illumination images without visual enhancement for low-light images, limit their use in real low-light scenes.

SUMMARY

The present disclosure provides an image restoration method, apparatus, electronic device, and storage medium.

According to an aspect of an embodiment of the present disclosure, there is provided an image restoration method including:

acquiring an original low-light image to be restored;

acquiring a pre-trained image processing model, wherein the image processing model includes an optical feature extraction network and an image feature extraction network; and inputting the original low-light image into the image processing model, so that an optical feature extraction network in the image processing model extracts an illumination feature from the original low-light image, and an image feature extraction network extracts a target image feature from the original low-light image, and generating a target bright image based on the illumination feature and the target image feature.

In some embodiments, acquiring a pre-trained image processing model includes:

acquiring a training sample set, wherein the training sample set includes a plurality of low-light sample images and a bright sample image corresponding to the low-light sample images;

inputting the low-light sample image into the initial image processing model, so that the optical feature extraction network and the image feature extraction network in the initial image processing model respectively extract image features of the low-light sample image, and generate a bright image based on the image features;

calculating a loss function value between the bright image and a bright sample image corresponding to the bright image; and determining the initial image processing model as the image processing model when the loss function value is less than the preset threshold value.

In some embodiments, the method further includes:

when the loss function value is greater than or equal to the preset threshold value, updating model parameters in the initial image processing model to obtain an updated initial image processing model; and training the updated initial image processing model using the low-light sample image in the training sample set until the loss function value between the bright image output by the updated initial image processing model and the bright sample image is less than a preset threshold value.

In some embodiments, the initial image processing model includes an optical feature extraction network and an image feature extraction network, wherein the optical feature extraction network includes a convolution parameter determined based on an illumination code matrix and a convolution layer, and the image feature extraction network includes a plurality of fully connected layers.

In some embodiments, before inputting the low-light sample image to the initial image processing model, the method further includes:

acquiring a plurality of real bright images with different exposure degrees, and cropping the real bright images to obtain a plurality of image blocks;

performing image encoding based on an image block to obtain code information, obtaining the illumination code matrix according to the code information; and determining the convolution parameters of the optical feature extraction network in the feature fusion process based on the illumination code matrix, and determining channel coefficients of the image feature extraction network in the feature fusion process.

In some embodiments, inputting the low-light sample image into the initial image processing model so that the optical feature extraction network and the image feature extraction network in the initial image processing model extract image features of the low-light sample image, and generate a bright image based on the image features includes:

inputting the low-light sample image to an initial image processing model so that the initial image processing model extracts the image features of the low-light sample image, generating first image features according to the image features and the illumination code matrix based on the optical feature extraction network, and generating second image features according to the image features and the channel coefficients based on the image feature extraction network, and fusing the first image features and the second image features to generate a bright image.

According to another aspect of an embodiment of the present disclosure, there is also provided an image restoration apparatus including:

- a first acquisition module used for acquiring an original low-light image to be restored;
- a second acquisition module used for acquiring a pre-trained image processing model, wherein the image processing model includes an optical feature extraction network and an image feature extraction network; and
- a processing module used for inputting the original low-light image into the image processing model, so that the optical feature extraction network in the image processing model extracts an illumination feature from the original low-light image, and an image feature extraction network extracts a target image feature from the original low-light image, and generating a target bright image based on the illumination feature and the target image feature.

According to another aspect of an embodiment of the present disclosure, there is also provided a storage medium including a stored program which, when running, executes the above-mentioned operations.

According to another aspect of the embodiments of the present disclosure, there is also provided an electronic device, including a processor, a communication interface, a memory, and a communication bus, wherein the processor, the communication interface, and the memory complete communication with each other via the communication bus; wherein: the memory is used for storing computer-readable instructions; the processor is used for executing the operations of the method by running a program stored on the memory.

In some embodiments, the present disclosure also provides one or more non-transitory storage medium storing computer-readable instructions, wherein the computer-readable instructions, when executed by one or more processors, cause the one or more processors to perform the operations of the method of an image restoration method of any of the above.

The details of one or more embodiments of the present disclosure are set forth in the accompanying drawings and the description below. Other features and advantages of the present disclosure will be apparent from the description and drawings and from the claims.

BRIEF DESCRIPTION OF THE DRAWINGS

The accompanying drawings, which are incorporated in and constitute a part of the present disclosure, illustrate embodiments consistent with the present disclosure and, together with the description, serve to explain the principles of the present disclosure.

In order to explain the embodiments of the present disclosure or the technical solutions in the prior art more clearly, the following will briefly introduce the drawings used in the embodiments or the description of the prior art, and it would be obvious for a person skilled in the art to obtain other drawings according to these drawings without involving any inventive effort.

DETAILED DESCRIPTION

In order that the objects, aspects, and advantages of the embodiments of the present disclosure will become more apparent, a more complete description of the embodiments of the present disclosure will be rendered by reference to the appended drawings. Obviously, the described embodiments are a portion of the embodiments of the present disclosure herein, rather than all of them, which are provided for purposes of illustration and are not intended to be exhaustive or limiting of the present disclosure. Based on the embodiments in the present disclosure, all the other embodiments obtained by a person skilled in the art without involving any inventive effort fall within the scope of protection of the present disclosure.

It should be noted that relational terms such as "first" and "second", and the like, may be used herein merely to distinguish one entity or action from another similar entity or action without necessarily requiring or implying any actual such relationship or order between such entities or actions. Furthermore, the terms "comprise", "include", or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by the phrase "includes one" does not, without more constraints, preclude the existence of additional identical elements in the process, method, article, or apparatus that includes the element.

Figure 1:
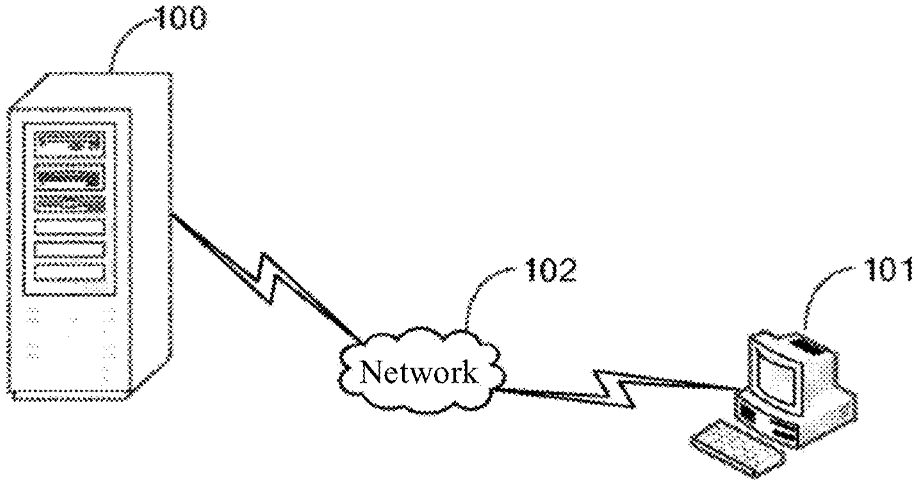
FIG. 1 is a schematic diagram of an application environment for an image restoration method according to one or more embodiments.

The present disclosure provides a method for process collaboration in a trunking, which may be applied to an application environment as shown in FIG. 1. The server 100 communicates with the client 101 via a network 102. The server 100 is used for receiving an image processing request sent by the client 101, and acquiring an original low-light image to be restored from the image processing request; acquiring a pre-trained image processing model, wherein the image processing model includes an optical feature extraction network and an image feature extraction network; inputting the original low-light image into the image processing model, so that the optical feature extraction network in the image processing model extracts an illumination feature from the original low-light image, and the image feature extraction network extracts a target image feature from the original low-light image, and generating a target bright image based on the illumination feature and the target image feature. The server 100 may be implemented as a stand-alone server or as a server trunking composed by a plurality of servers.

The client 101 is used for sending an image processing request to the server 100. The client 101 may be but is not limited to, various personal computers, notebook computers, smart phones, tablet computers, and portable wearable devices.

The network 102 is used for realizing a network connection between the client 101 and the server 100, and in some embodiments, the network 102 may include various types of wired or wireless networks.

The embodiments of the present disclosure provide an image restoration method and apparatus, an electronic device, and a storage medium. The method provided by the embodiments of the present disclosure may be applied to any desired electronic device, for example, the electronic device such as a server, a terminal, etc. which is not specifically limited herein, and will be hereinafter referred to as the electronic device for short for convenience of description.

Figure 2:
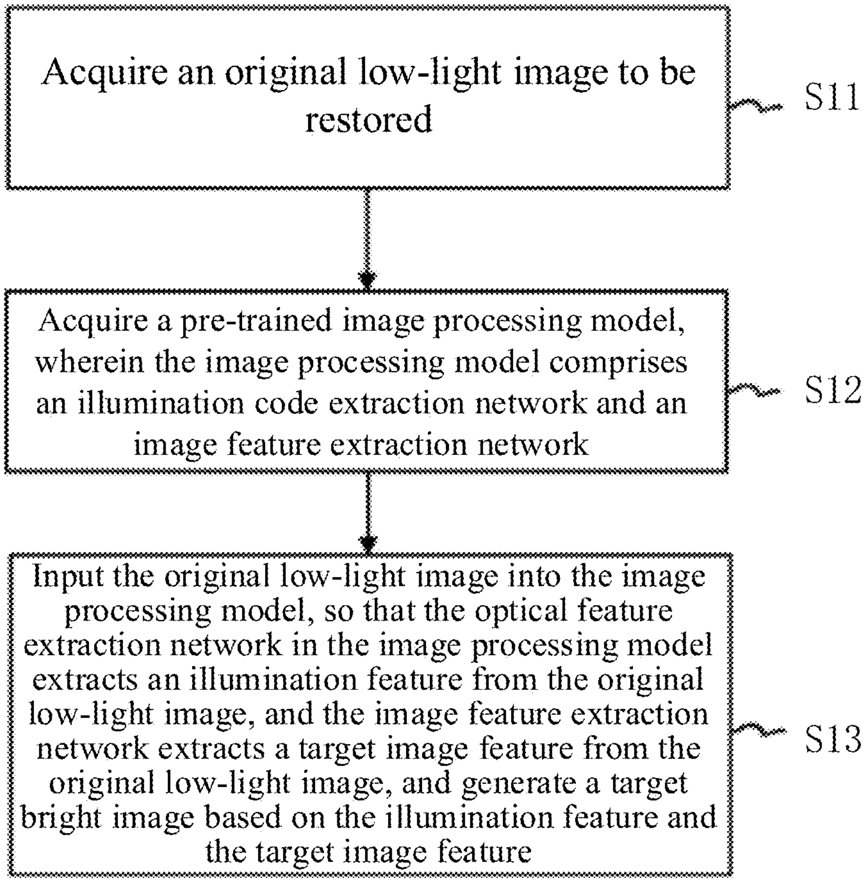
FIG. 2 is a flow chart of an image restoration method according to one or more embodiments.

According to an aspect of an embodiment of the present disclosure, a method embodiment of an image restoration method is provided. FIG. 2 is a flow chart of an image restoration method provided by an embodiment of the present disclosure, and the method applied to the server in FIG. 1 is taken as an example to illustrate, the method includes:

step S11, acquiring an original low-light image to be restored.

The method provided by an embodiment of the present disclosure is applied to a service end, and the service end is used for executing a restoration operation of an original low-light image. In some embodiments, the service end acquires a low-light image from an image processing request by receiving the image processing request sent by a client and determines the low-light image as the original low-light image to be restored when the resolution of the low-light image is less than a preset resolution.

Step S12, acquiring a pre-trained image processing model, wherein the image processing model includes an optical feature extraction network and an image feature extraction network.

In an embodiment of the present disclosure, the pre-trained image processing model includes the optical feature extraction network and the image feature extraction network, wherein the optical feature extraction network includes a convolution parameter determined based on an illumination code matrix and a convolution layer, and the image feature extraction network includes a plurality of fully connected layers. It should be noted that the convolution parameters of the convolution layer in the optical feature extraction network may be set according to a pre-obtained illumination code matrix, and channel coefficients between the fully connected layers in the image feature extraction network may also be set according to the pre-obtained illumination code matrix.

As an example, firstly pre-trained illumination code matrix is acquired as R, and the convolution parameters w in the optical feature extraction network are set based on the illumination code matrix R, and then it determines that a convolution kernel of a first convolution layer is 3×3, and a convolution kernel of a second layer is 1×1. At the same time, the channel coefficients in the image feature extraction network are set based on the illumination code matrix R.

Figure 3:
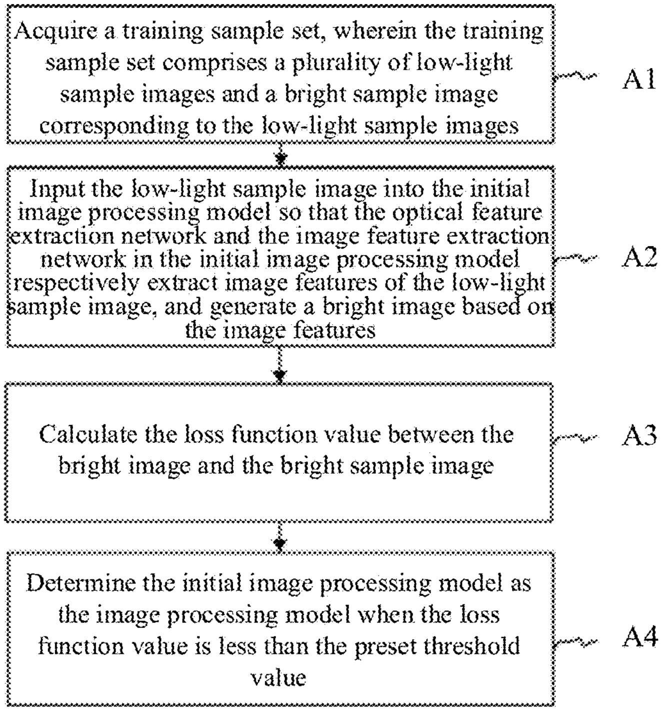
FIG. 3 is another flow chart of an image restoration method according to one or more embodiments.

In an embodiment of the present disclosure, as shown in FIG. 3, in step S12, acquiring a pre-trained image processing model includes the following steps A1-A4:

step A1, acquiring a training sample set, wherein the training sample set includes a plurality of low-light sample images and a bright sample image corresponding to the low-light sample images.

In an embodiment of the present disclosure, the training sample set includes a low-light sample image and a bright sample image that are paired, wherein the dark sample image is a low-resolution image obtained based on short exposure in a low-light environment, and the bright sample image is a high-resolution image obtained based on long exposure in the low-light environment.

Step A2, inputting the low-light sample image into an initial image processing model, so that an image feature extraction network and an optical feature extraction network in the initial image processing model respectively extracting image features of the low-light sample image, and generating the bright image based on the image features.

In an embodiment of the present disclosure, the initial image processing model includes the optical feature extraction network and the image feature extraction network, wherein the optical feature extraction network includes a convolution parameter determined based on the illumination code matrix and the convolution layer, and the image feature extraction network includes a plurality of fully connected layers.

In an embodiment of the present disclosure, the low-light sample image is input to the initial image processing model so that the initial image processing model extracts image features from the low-light sample image, first image features are generated according to the image features and the convolution parameters based on the optical feature extraction network, and second image features are generated according to the image features and the channel coefficients based on the image feature extraction network, and the first image features and the second image features are fused to generate the bright image.

In an embodiment of the present disclosure, fusing a first image feature and a second image feature to generate a bright image includes: adding the first image feature and the second image feature to obtain a fused image feature, and generating the bright image based on the fused image feature.

Step A3, calculating a loss function value between the bright image and the bright sample image.

In an embodiment of the present disclosure, the loss function value between the bright image and the bright sample image is calculated as follows:

$Loss=\|GT-ISR\|^2$, in the formula, GT is the image feature of the bright image and ISR is the image feature of the bright sample image.

Step A4, determining the initial image processing model as the image processing model when the loss function value is less than the preset threshold value.

In an embodiment of the present disclosure, when the Loss is less than the preset threshold value, the initial image processing model is determined as the target processing model.

In an embodiment of the present disclosure, the method further includes the following steps B1-B2:

step B1, when the loss function value is greater than or equal to the preset threshold value, updating model parameters in the initial image processing model to obtain an updated initial image processing model.

Step B2, training the updated initial image processing model using the low-light sample image in the training sample set until the loss function value between the bright image output by the updated initial image processing model and the bright sample image is less than the preset threshold value.

In an embodiment of the present disclosure, according to the derivative of the loss function, the error is gradient transmitted back, and the parameters in the model are modified to obtain new parameter values. Subsequently, the model re-performs image processing using the new parameter values to obtain a new loss function of the output image. And when the loss function does not decrease, a final image processing model is obtained.

In an embodiment of the present disclosure, before inputting the low-light sample image into the initial image processing model, the method further includes the following steps C1-C3:

step C1, acquiring a plurality of real bright images with different exposure degrees, and cropping the real bright images to obtain a plurality of image blocks.

Step C2, performing image encoding based on an image block to obtain code information, and obtaining an illumination code matrix according to the code information.

Step C3, determining convolution parameters of the optical feature extraction network in the feature fusion process based on the illumination code matrix, and determining channel coefficients of the image feature extraction network in the feature fusion process.

In an embodiment of the present disclosure, since there is a plurality of image blocks, each image block is encoded, the code information corresponding to each image block may be obtained, an illumination code is extracted from the code information, and an illumination code matrix is generated based on each illumination code. Then, the illumination code matrix is trained, and the convolution parameters in the optical feature extraction network and the channel coefficients in the image feature extraction network may be preset according to the trained illumination code matrix.

Figure 4:
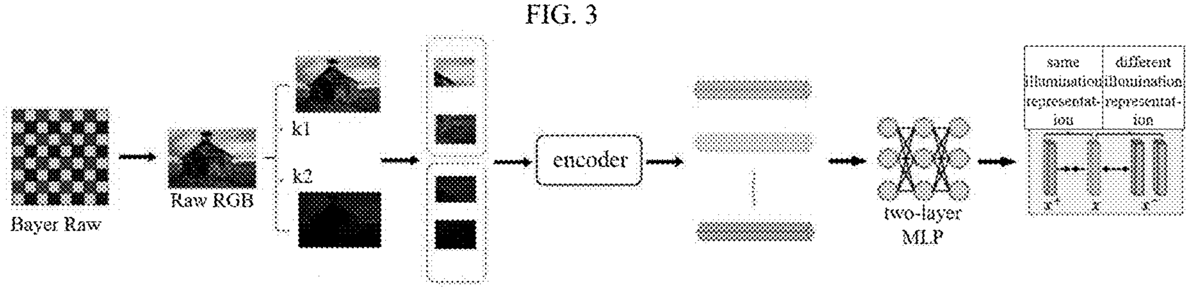
FIG. 4 is a training schematic diagram of an illumination code matrix according to one or more embodiments.

It should be noted that images obtained from the same scene at different exposure levels have different illumination features, and the illumination features between different parts of the image are the same. For example: As shown in FIG. 4, Bayer Raw format images of different exposures are given under the same scene and converted into RGB diagrams, image blocks within the same image may be considered as positive samples. Among them, the encoder takes a 6-layer CNN to extract the illumination code matrix for the above-mentioned image block, and then it is input into a 2-layer two-layer MLP to obtain the illumination code matrix: $x^+$, x, $x^-$. In the obtained illumination code matrix, $x^+$ and x should be more similar (i.e. same illumination representation), and $x^+$ and $x^-$ should be distant (i.e. different illumination representation). InfoNCE is used here to measure the similarity between each representation, as defined below. Where t is a hyperparameter.

$$L_x = -\log\frac{\exp(x \times x^+/t)}{\sum_{n=1}^{N}\exp(x \times x^-/t)},$$

$L_x$ is the loss of a single illumination code.

In the training process, firstly, B images (namely, B different exposure images) are selected and two blocks are randomly cropped in each image, and then these 2×B image blocks are encoded as $$\{p_i^1, p_i^2 \in R^{256}\}$$

and an overall loss is calculated based on 2B image block encoding, and the calculation process is as follows:

$$L_{illumination} = \sum_{i=1}^{B} -\log\frac{\exp(p_i^1 \times p_i^2/t)}{\sum_{j-1}^{N_{queue}} ex(p_i^1 \times p_{queue}^j/t)}$$

and $L_{illumination}$ are the overall loss, $$p_{queue}^j$$

is an image block code queue, j is a random number.

The final illumination code matrix is then obtained when the overall loss is less than the preset threshold value.

Step S13, the original low-light image is input into the image processing model, so that the optical feature extraction network in the image processing model extracts the illumination feature from the original low-light image, and the image feature extraction network extracts the target image feature from the original low-light image, and a target bright image is generated based on the illumination feature and the target image feature.

Figure 5:
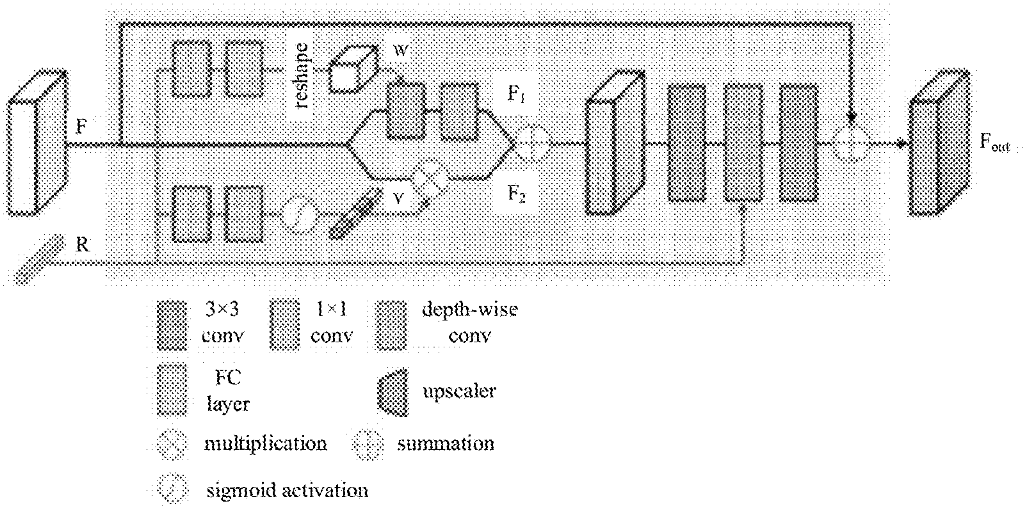
FIG. 5 is a schematic diagram of an image restoration process according to one or more embodiments.

In an embodiment of the present disclosure, step S13, the original low-light image is input into the image processing model, so that the optical feature extraction network in the image processing model extracts the illumination feature from the original low-light image, and the image feature extraction network extracts the target image feature from the original low-light image, and the specific process of generating the target bright image based on the illumination feature and the target image feature is as follows:

as shown in FIG. 5, the image processing model firstly extracts the original image feature F from the original low-light image through the convolution layer, and the original image feature F would be transmitted to the optical feature extraction network and the image feature extraction network respectively. At this moment, the fully connected layers (Fully Connected, abbreviated as FC) in the optical feature extraction network multiply the original image feature F with a convolution parameter W to obtain a processed original image feature, and then the processed original image feature is input into the convolution layer of the optical feature extraction network (the convolution layer includes: a deep convolution layer and a convolution layer with a convolution kernel of 1×1) to obtain the illumination feature F1. At the same time, the fully connected layers (Fully Connected, abbreviated as FC) of the image feature extraction network will perform feature processing on the original image feature F, and obtain the target image feature F2 by multiplying the processed original image feature with the channel coefficient v. The illumination feature F1 and the target image feature F2 are fused, and the target bright image is generated based on the fused features.

In the present disclosure, the optical feature extraction network and the image feature extraction network in the image processing model are used to respectively process image features of the original low-light image, to obtain the illumination features and the target image features, and then image restoration is performed according to the features after the illumination features and the target image features are fused, so as to obtain a bright image by performing low-light enhancement on the low-light image via a model. And compared with the prior art, it is no longer necessary to respectively use two models, a low-light enhancement model and a super resolution model, to perform image restoration, and the processing efficiency is improved. At the same time, the illumination code matrix of the image is learned in an unsupervised way, and the image features are fused by using the illumination code matrix in the image processing model, and finally, a high-light super-resolution image is obtained, which may realize low-light enhancement visually.

Figure 6:
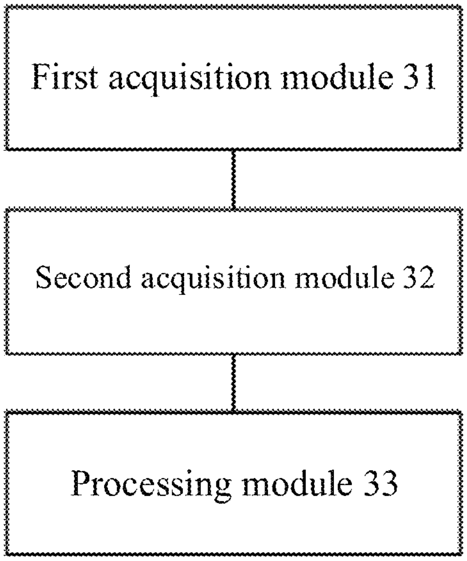
FIG. 6 is a block diagram of an image restoration apparatus according to one or more embodiments.

FIG. 6 is a block diagram of an image restoration apparatus that may be implemented as part or all of an electronic device by software, hardware, or a combination of both, according to an embodiment of the present disclosure. As shown in FIG. 5, the image restoration apparatus includes:

a first acquisition module 31 used for acquiring an original low-light image to be restored;

a second acquisition module 32 used for acquiring a pre-trained image processing model, wherein the image processing model includes an optical feature extraction network and an image feature extraction network;

a processing module 33 used for inputting an original low-light image into an image processing model, so that the optical feature extraction network in the image processing model extracts an illumination feature from the original low-light image, and the image feature extraction network extracts a target image feature from the original low-light image, and generates a target bright image based on the illumination feature and the target image feature.

In an embodiment of the present disclosure, a first acquisition module is used for acquiring a training sample set, wherein the training sample set includes a plurality of low-light sample images and a bright sample image corresponding to the low-light sample images; inputting the low-light sample image into the initial image processing model so that the optical feature extraction network and the image feature extraction network in the initial image processing model respectively extract image features of the low-light sample image, and generating a bright image based on the image features; calculating a loss function value between the bright image and a bright sample image corresponding to the bright image; determining the initial image processing model as the image processing model when the loss function value is less than the preset threshold value.

In an embodiment of the present disclosure, the apparatus further includes a training module, for updating model parameters in the initial image processing model to obtain an updated initial image processing model when the loss function value is greater than or equal to the preset threshold value; training the updated initial image processing model using the low-light sample image in the training sample set until the loss function value between the bright image output by the updated initial image processing model and the bright sample image is less than the preset threshold value.

In an embodiment of the present disclosure, the initial image processing model includes an optical feature extraction network and an image feature extraction network, wherein the optical feature extraction network includes a convolution parameter determined based on an illumination code matrix and a convolution layer, and the image feature extraction network includes a plurality of fully connected layers.

In an embodiment of the present disclosure, the image restoration apparatus further includes a determination module, for acquiring a plurality of real bright images with different exposure degrees, and cropping the real bright images to obtain a plurality of image blocks; performing image encoding based on the image block to obtain code information, and obtaining the illumination code matrix according to the code information; determining the convolution parameters of the optical feature extraction network in the feature fusion process based on the illumination code matrix, and determining channel coefficients of the image feature extraction network in the feature fusion process.

In an embodiment of the present disclosure, the first acquisition module is used for inputting a low-light sample image to the initial image processing model, so that the initial image processing model extracts image features from the low-light sample image, first image features are generated according to the image features and the illumination code matrix based on an optical feature extraction network, and second image features are generated according to the image features and the channel coefficients based on the image feature extraction network, and the first image features and the second image features are fused to generate a bright image.

In an embodiment of the present disclosure, the processing module 33 is used for inputting an original low-light image into an image processing model so that the image processing model extracts image features from the original low-light image, illumination features are generated according to the image features and an illumination code matrix based on the optical feature extraction network in the image processing model, and target image features are generated according to the image features and the channel coefficients based on the image feature extraction network, and the illumination features and the target image features are fused to generate the target bright image.

In an embodiment of the present disclosure, a single model is used for performing low-light enhancement on a low-resolution low-light image so as to finally obtain a high-resolution bright image. Compared with the prior art, it is no longer necessary to respectively use two models, the low-light enhancement model and the super resolution model, to perform image restoration, so as to shorten the processing flow. At the same time, an unsupervised method is used to learn the illumination code matrix of the image, and various parameters in an image processing model are determined using the illumination code matrix, so that the image processing model may finally restore a low-light image into a super-resolution image, thus realizing low-light enhancement visually.

Figure 7:
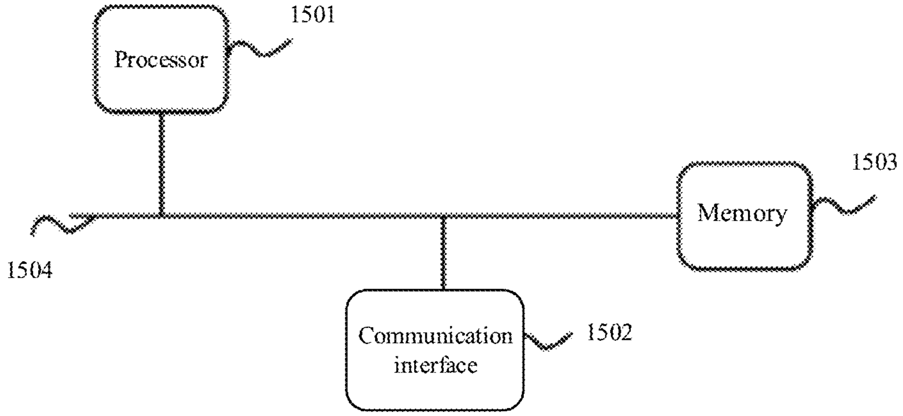
FIG. 7 is a schematic structural diagram of an electronic device according to one or more embodiments.

The embodiments of the present disclosure also provide an electronic device, as shown in FIG. 7, which may include: a processor 1501, a communication interface 1502, a memory 1503, and a communication bus 1504, wherein the processor 1501, the communication interface 1502, and the memory 1503 communicate with each other via the communication bus 1504.

The memory 1503 is used for storing computer-readable instructions;

the processor 1501 is used for when executing computer-readable instructions stored on memory 1503, realizing the steps of the embodiments described above.

The communication bus mentioned in the above-mentioned terminal may be a Peripheral Component Interconnect (PCI) bus or an Extended Industry Standard Architecture (EISA) bus, etc. The communication bus may be divided into an address bus, a data bus, a control bus, etc. For ease of illustration, only one bold line is shown in the figure, but it does not indicate that there is only one bus or one type of bus.

The communication interface is used for communication between the terminal and other devices.

The transitory memory may include random access memory (RAM) or may include non-transitory memory, such as at least one disk memory. Optionally, the memory may be at least one memory apparatus located remotely from the aforementioned processor.

The above-mentioned processor may be a general-purpose processor, including a central processing unit (CPU), a network processor (NP), etc.; they may also be a digital signal processor (DSP), an application-specific integrated circuit (ASIC), a field-programmable gate array (FPGA) or other programmable logic devices, discrete gate or transistor logic devices, discrete hardware components.

Embodiments also provide one or more non-transitory storage mediums storing computer-readable instructions that, when executed by one or more processors, cause one or more processors to perform the steps of the image restoration method in any of the embodiments described above.

In yet another embodiment provided in the present disclosure, there is also provided a computer-readable instruction product including instructions which, when running on a computer, cause the computer to execute the image restoration method of any one of the embodiments described above.

It will be appreciated by those skilled in the art that the structure shown in FIG. 7 is merely a block diagram of a portion of the structures relevant to the solution of the present disclosure and does not constitute a limitation on the apparatus to which the solution of the present disclosure is applied, and that a particular apparatus may include more or fewer components than those shown in the figures, or some of the components may be combined, or have a different arrangement of the components.

It will be appreciated by those of ordinary skill in the art that implementing all or part of the flow of the methods of the embodiments described above may be accomplished by instructing the associated hardware via computer-readable instructions, which may be stored on a non-transitory computer-readable storage medium, which when executed, may include the flow of the embodiments of the methods described above. Among other things, any references to memory, storage, databases, or other medium used in embodiments provided in the present disclosure may include non-transitory and/or transitory memory. The non-transitory memory may include read-only memory (ROM), programmable ROM (PROM), electrically programmable ROM (EPROM), electrically erasable programmable ROM (EEPROM), or flash memory. transitory memory may include random access memory (RAM) or external cache memory. By way of illustration and not limitation, RAM is available in many forms such as static RAM (SRAM), dynamic RAM (DRAM), synchronous DRAM (SDRAM), dual data rate SDRAM (DDRSDRAM), enhanced SDRAM (ESDRAM), Synchlink DRAM (SLDRAM), memory bus (Rambus) direct RAM (RDRAM), direct memory bus dynamic RAM (DRDRAM), and memory bus dynamic RAM (RDRAM), etc.

Each technical feature of the above-mentioned embodiments may be combined in any combination, and in order to make the description concise, not all the possible combinations of each technical feature in the above-mentioned embodiments are described; however, as long as there is no contradiction between the combinations of these technical features, they should be considered as the scope of the description.

The above examples are indicative of only a few embodiments of the present disclosure, which are described in more detail and detail but are not to be construed as limiting the scope of the invention. It should be noted that a person skilled in the art could also make several changes and modifications without departing from the concept of the present disclosure, which falls within the scope of the present disclosure. Accordingly, the protection sought herein is as set forth in the claims below.

The invention claimed is:

1. An image restoration method, comprising:

acquiring an original low-light image to be restored;

acquiring a pre-trained image processing model, wherein the pre-trained image processing model comprises an optical feature extraction network and an image feature extraction network, the optical feature extraction network comprises a convolution parameter determined based on an illumination code matrix and a convolution layer, and the image feature extraction network comprises a plurality of fully connected layers; and inputting the original low-light image into the pre-trained image processing model, so that the optical feature extraction network in the pre-trained image processing model extracts an illumination feature from the original low-light image, and the image feature extraction network extracts a target image feature from the original low-light image, and generating a target bright image based on the illumination feature and the target image feature.

2. The method according to claim 1, wherein acquiring the pre-trained image processing model comprises:

acquiring a training sample set, wherein the training sample set comprises a plurality of low-light sample images and bright sample images corresponding to the plurality of low-light sample images;

inputting each of the plurality of low-light sample images into an initial image processing model, so that an optical feature extraction network and an image feature extraction network in the initial image processing model respectively extract image features of each of the plurality of low-light sample images, and generating a bright image based on the image features;

calculating a loss function value between the bright image and a bright sample image corresponding to the bright image; and when the loss function value is less than a preset threshold value, determining the initial image processing model as the pre-trained image processing model.

3. The method according to claim 2, further comprising:

when the loss function value is greater than or equal to the preset threshold value, updating model parameters in the initial image processing model to obtain an updated initial image processing model; and training the updated initial image processing model using the plurality of low-light sample images in the training sample set until the loss function value between the bright image output by the updated initial image processing model and the bright sample image is less than the preset threshold value.

4. The method according to claim 2, wherein the initial image processing model comprises: the optical feature extraction network and the image feature extraction network, wherein the optical feature extraction network comprises the convolution parameter determined based on the illumination code matrix and the convolution layer, and the image feature extraction network comprises the plurality of fully connected layers.

5. The method according to claim 4, wherein before inputting each of the plurality of low-light sample images to the initial image processing model, the method further comprises:

acquiring a plurality of real bright images with different exposure degrees, and cropping the plurality of real bright images to obtain a plurality of image blocks;

performing image encoding based on the plurality of image blocks to obtain code information, and obtaining the illumination code matrix according to the code information; and determining the convolution parameters of the optical feature extraction network in a feature fusion process based on the illumination code matrix, and determining channel coefficients of the image feature extraction network in the feature fusion process.

6. The method according to claim 5, wherein inputting each of the plurality of low-light sample images into the initial image processing model, so that the optical feature extraction network and the image feature extraction network in the initial image processing model extract image features of each of the plurality of low-light sample images, and generating the bright image based on the image features comprises:

inputting each of the plurality of low-light sample images to the initial image processing model, so that the initial image processing model extracts the image features of each of the plurality of low-light sample images, generating first image features according to the image features and the convolution parameters based on the optical feature extraction network, and generating second image features according to the image features and the channel coefficients based on the image feature extraction network, and fusing the first image features and the second image features to generate the bright image.

7. The method according to claim 6, wherein fusing the first image features and the second image features to generate the bright image comprises:

adding the first image features and the second image features to obtain a fused image feature; and generating the bright image based on the fused image feature.

8. The method according to claim 5, wherein performing image encoding based on the plurality of image blocks to obtain the code information, and obtaining the illumination code matrix according to the code information comprises:

encoding each of the plurality of image blocks to obtain the code information corresponding to each of the plurality of image blocks;

extracting an illumination code from the code information; and generating the illumination code matrix according to each illumination code.

9. The method according to claim 8, wherein the illumination code matrix comprises representations $x^+$, x, and $x^-$, InfoNCE is used to measure a similarity between each representation, and InfoNCE is defined as follows:

$$L_x = -\log\frac{\exp(x \times x^+ / t)}{\sum_{n=1}^{N}\exp(x \times x^- / t)}$$

where t is a hyperparameter, $L_x$ is a loss of a single illumination code.

10. The method according to claim 2, wherein the loss function value between the bright image and the bright sample image is calculated as follows:

$$\text{Loss}=\|GT-ISR\|^2$$

where GT is an image feature of the bright image, and ISR is an image feature of the bright sample image.

11. The method according to claim 1, wherein inputting the original low-light image into the pre-trained image processing model, so that the optical feature extraction network in the pre-trained image processing model extracts the illumination feature from the original low-light image, and the image feature extraction network extracts the target image feature from the original low-light image, and generating the target bright image based on the illumination feature and the target image feature comprises:

inputting the original low-light image into the pre-trained image processing model, so that the pre-trained image processing model extracts image features from the original low-light image, generating the illumination feature according to the image features and the illumination code matrix based on the optical feature extraction network in the pre-trained image processing model, generating the target image feature according to the image features and channel coefficients based on the image feature extraction network, and fusing the illumination feature and the target image feature to generate the target bright image.

12. The method according to claim 1, wherein acquiring the original low-light image to be restored comprises:

acquiring a low-light image from an image processing request sent by a client; and determining the low-light image as the original low-light image to be restored when a resolution of the low-light image is less than a preset resolution.

13. The method according to claim 1, wherein the method further comprises:

acquiring a pre-trained illumination code matrix;

setting the convolution parameter in the optical feature extraction network based on the pre-trained illumination code matrix, determining a convolution kernel of a first convolution layer as 3×3 and a convolution kernel of a second convolution layer as 1×1, wherein the convolution layer comprises the first convolution layer and the second convolution layer; and setting channel coefficients in the image feature extraction network based on the pre-trained illumination code matrix.

14. A non-transitory computer-readable storage medium, storing computer-readable instructions, wherein the computer-readable instructions, when executed by one or more processors, cause the one or more processors to perform operations comprising:

acquiring an original low-light image to be restored;

acquiring a pre-trained image processing model, wherein the pre-trained image processing model comprises an optical feature extraction network and an image feature extraction network, the optical feature extraction network comprises a convolution parameter determined based on an illumination code matrix and a convolution layer, and the image feature extraction network comprises a plurality of fully connected layers; and inputting the original low-light image into the pre-trained image processing model, so that the optical feature extraction network in the pre-trained image processing model extracts an illumination feature from the original low-light image, and the image feature extraction network extracts a target image feature from the original low-light image, and generating a target bright image based on the illumination feature and the target image feature.

15. The non-transitory computer-readable storage medium according to claim 14, wherein the operation of inputting the original low-light image into the pre-trained image processing model, so that the optical feature extraction network in the pre-trained image processing model extracts the illumination feature from the original low-light image, and the image feature extraction network extracts the target image feature from the original low-light image, and generating the target bright image based on the illumination feature and the target image feature comprises:

inputting the original low-light image into the pre-trained image processing model, so that the pre-trained image processing model extracts image features from the original low-light image, generating the illumination feature according to the image features and the illumination code matrix based on the optical feature extraction network in the pre-trained image processing model, generating the target image feature according to the image features and channel coefficients based on the image feature extraction network, and fusing the illumination feature and the target image feature to generate the target bright image.

16. The non-transitory computer-readable storage medium according to claim 14, wherein the operation of acquiring the pre-trained image processing model comprises:

acquiring a training sample set, wherein the training sample set comprises a plurality of low-light sample images and bright sample images corresponding to the plurality of low-light sample images;

inputting each of the plurality of low-light sample images into an initial image processing model, so that an optical feature extraction network and an image feature extraction network in the initial image processing model respectively extract image features of each of the plurality of low-light sample images, and generating a bright image based on the image features;

calculating a loss function value between the bright image and a bright sample image corresponding to the bright image; and when the loss function value is less than a preset threshold value, determining the initial image processing model as the pre-trained image processing model.

17. The non-transitory computer-readable storage medium according to claim 16, wherein the operations further comprise:

when the loss function value is greater than or equal to the preset threshold value, updating model parameters in the initial image processing model to obtain an updated initial image processing model; and training the updated initial image processing model using the plurality of low-light sample images in the training sample set until the loss function value between the bright image output by the updated initial image processing model and the bright sample image is less than the preset threshold value.

18. An electronic device, comprising a processor, a communication interface, a memory, and a communication bus, wherein the processor, the communication interface, and the memory complete communication with each other via the communication bus; wherein:

the memory is used for storing computer-readable instructions; and the processor is used for executing operations comprising:

acquiring an original low-light image to be restored;

acquiring a pre-trained image processing model, wherein the pre-trained image processing model comprises an optical feature extraction network and an image feature extraction network, the optical feature extraction network comprises a convolution parameter determined based on an illumination code matrix and a convolution layer, and the image feature extraction network comprises a plurality of fully connected layers; and inputting the original low-light image into the pre-trained image processing model, so that the optical feature extraction network in the pre-trained image processing model extracts an illumination feature from the original low-light image, and the image feature extraction network extracts a target image feature from the original low-light image, and generating a target bright image based on the illumination feature and the target image feature.

19. The electronic device according to claim 18, wherein the operation of inputting the original low-light image into the pre-trained image processing model, so that the optical feature extraction network in the pre-trained image processing model extracts the illumination feature from the original low-light image, and the image feature extraction network extracts the target image feature from the original low-light image, and generating the target bright image based on the illumination feature and the target image feature comprises:

inputting the original low-light image into the pre-trained image processing model, so that the pre-trained image processing model extracts image features from the original low-light image, generating the illumination feature according to the image features and the illumination code matrix based on the optical feature extraction network in the pre-trained image processing model, generating the target image feature according to the image features and channel coefficients based on the image feature extraction network, and fusing the illumination feature and the target image feature to generate the target bright image.

20. The electronic device according to claim 18, wherein the operation of acquiring the pre-trained image processing model comprises:

acquiring a training sample set, wherein the training sample set comprises a plurality of low-light sample images and a bright sample images corresponding to the plurality of low-light sample images;

inputting each of the plurality of low-light sample images into an initial image processing model, so that an optical feature extraction network and an image feature extraction network in the initial image processing model respectively extract image features of each of the plurality of low-light sample images, and generating a bright image based on the image features;

calculating a loss function value between the bright image and a bright sample image corresponding to the bright image; and when the loss function value is less than a preset threshold value, determining the initial image processing model as the pre-trained image processing model.

* * * * *